United States Patent
Sivley, IV et al.

(10) Patent No.: US 7,607,333 B2
(45) Date of Patent: Oct. 27, 2009

(54) HELICAL GROOVE FOR A TUBULAR CONNECTION

(75) Inventors: Robert S. Sivley, IV, Kingwood, TX (US); Harris A. Reynolds, Jr., Houston, TX (US)

(73) Assignee: Hydril LLC, Houston, TX (US)

( * ) Notice: Subject to any disclaimer, the term of this patent is extended or adjusted under 35 U.S.C. 154(b) by 121 days.

(21) Appl. No.: 11/627,157

(22) Filed: Jan. 25, 2007

(65) Prior Publication Data

US 2007/0132237 A1 Jun. 14, 2007

Related U.S. Application Data (63) Continuation of application No. 10/958,976, filed on Oct. 5, 2004.

(51) Int. Cl.
*B21C 37/20* (2006.01)
(52) U.S. Cl. ............... 72/370.18; 72/367.1; 72/370.17; 72/370.21
(58) Field of Classification Search ........... 72/367.1, 72/368, 370.16, 370.17, 370.18, 370.21; 285/333, 334
See application file for complete search history.

(56) References Cited

U.S. PATENT DOCUMENTS

| | | | |
|---|---|---|---|
| 2,273,017 A * | 2/1942 | Boynton | 285/89 |
| 2,669,469 A | 2/1954 | Finch | |
| RE30,647 E | 6/1981 | Blose | |
| 4,420,865 A * | 12/1983 | Haygood | 29/402.19 |
| 4,524,996 A * | 6/1985 | Hunt | 285/55 |
| 4,703,954 A | 11/1987 | Ortloff | |
| 4,822,081 A | 4/1989 | Blose | |
| 4,846,270 A * | 7/1989 | Setterberg et al. | 166/115 |

(Continued)

FOREIGN PATENT DOCUMENTS

CN 1136409 C 10/2001

(Continued)

OTHER PUBLICATIONS

Office Action in U.S. Appl. No. 10/958,976 Mailed Jun. 12, 2008, (10 Pages).

(Continued)

*Primary Examiner*—Edward Tolan
(74) *Attorney, Agent, or Firm*—Osha • Liang LLP (57) ABSTRACT

A tubular connection and methods of manufacturing a box member. The tubular connection includes a box member that includes an internal thread and a pin member that includes an external thread. The external thread is adapted to threadedly engage the internal thread. A substantially helical groove is formed on an outer surface of the box member. The method of manufacturing the box member includes selecting an outer diameter for a box member that causes the tool joint to have a greater than a selected bending strength ratio. A helical groove is formed on the outer diameter of the box member such that the helical groove reduces the bending strength ratio to be about the selected bending strength ratio. An internal thread is formed on an internal surface of the box member. Another method of manufacturing the box member includes forming an internal thread on an internal surface of a cylinder and forming a substantially helical groove on an outer surface of the cylinder. The substantially helical groove is positioned substantially in-lead with the internal thread.

12 Claims, 5 Drawing Sheets

U.S. PATENT DOCUMENTS

| | | | |
|---|---|---|---|
| RE34,467 E | 12/1993 | Reeves | |
| 5,423,579 A | 6/1995 | Blose et al. | |
| 5,454,605 A | 10/1995 | Mott | |
| 6,607,220 B2 | 8/2003 | Sivley, IV | |
| 6,722,706 B2 | 4/2004 | Church | |
| 6,767,035 B2 * | 7/2004 | Hashem | 285/333 |
| 6,811,189 B1 | 11/2004 | DeLange et al. | |
| 6,997,264 B2 * | 2/2006 | Simpson et al. | 166/380 |
| 7,086,669 B2 * | 8/2006 | Evans et al. | 285/382.2 |
| 7,380,840 B2 * | 6/2008 | Sivley et al. | 285/334 |
| 2004/0069498 A1 | 4/2004 | Simpson et al. | |
| 2004/0090068 A1 | 5/2004 | Evans et al. | |

FOREIGN PATENT DOCUMENTS

| | | |
|---|---|---|
| WO | 02/29290 A2 | 4/2002 |
| WO | 03/032331 A2 | 10/2002 |
| WO | 2004/023014 A2 | 8/2003 |

OTHER PUBLICATIONS

Office Action dated Jan. 8, 2008 issued by the Canadian Intellectual Property Office in Canadian Application No. 2,581,889, 3 pages.

U.S. Office Action issued in U.S. Appl. No. 10/958,976 mailed Dec. 19, 2008, (11 Pages).

English translation of a Second Office Action dated Feb. 20, 2009 issued by the China Patent Office in corresponding Application No. 2005/80033925.5, 10 pages.

European search report; Application No. 05810543.8-2424; May 25, 2009; 5 pages.

Chinese Official Action issued in Application No. 200580033925.5 dated Jun. 19, 2009 (9 pages).

* cited by examiner

HELICAL GROOVE FOR A TUBULAR CONNECTION

CROSS-REFERENCE TO RELATED APPLICATIONS

This application is a continuation of U.S. patent application Ser. No. 10/958,976, filed Oct. 5, 2004.

BACKGROUND OF INVENTION

1. Field of the Invention

The invention relates generally to threaded connections on tubular pieces. More specifically, the invention relates to threaded connections on tubular pieces that are adapted to be plastically radially expanded.

2. Background Art

Casing joints, liners, and other oilfield tubulars are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art In some well construction operations, it is advantageous to radially plastically expand threaded pipe or casing joints in a drilled ("open") hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

Deformations occurring proximate threaded tubular connections, such as those found on oilfield casing and tubing, on the ends of radially expandable casing after radial plastic expansion can be problematic. Problems are encountered in at least three areas. First, internal metal-to-metal seals, which rely on radial contact stresses to form the seal, may unload (i.e., lose sealing engagement) if a pin nose formed on a pin connection deforms in a direction away from a seal surface formed on a box connection. Second, gross deformation of the pipe ends proximate the region of the threaded connection can cause some of the threads to move radially and, as a result, unload. This adversely affects a load carrying capacity of the threaded connection. Third, local deformations in the region proximate each individual thread may "twist" the individual threads, thereby adversely affecting a load distribution between individual threads.

When a cold-forming expansion process is used (e.g., when a cold-forming expansion tool or "pig" is moved through a casing string so as to radially plastically expand the casing string), the casing string is usually run into the hole "box-down" (e.g., the "box" or female threaded connection is run into the hole facing downhole so that the expansion tool ("pig") does not deform the pin nose of each connection when the expansion tool is forced upward through the casing string). Note that tubular strings such as drill pipe, casing, or similar tubular members are normally run into the well "pin-down" because it is easier to make up the threaded connections in the tubular string.

Prior art analysis of expandable threaded tubular connections has concentrated on an analysis of the post-expansion stresses in the connection, with an implicit assumption that a relationship between stress and strain is relatively linear, even within the plastic deformation regime. However, thin-walled carbon steels typical of those used in oilfield tubular goods exhibit a drastically non-linear relationship between stress and strain during plastic deformation, particularly in a near-plastic region immediately following a yield point where plastic yielding is characterized by the formation of Lüders bands. For this reason, it is desirable that expandable threaded tubular connections be designed to control and focus the plastic strains resulting from expansion rather than be designed to achieve a desired stress field in the connection so that threaded connection and seal integrity may be maintained after radial plastic expansion of the threaded connection (and the associated tubular member on which the threaded connection is formed).

One example of a tubular connection designed to control and focus the plastic strains resulting from expansion is shown in U.S. Pat. No. 6,607,220 B2, which is assigned to the assignee of the present invention and incorporated herein by reference in its entirety. In the '220 patent, a circumferential groove is placed at one or more locations on the outside surface of the box member to control the distortion of the threaded connection during the radial plastic expansion. The '220 patent also discloses placing a helical groove on the inside or outside surface of the pin member at an axial position substantially equal to the root of the external thread.

SUMMARY OF INVENTION

In one aspect, the present invention relates to a tubular connection including a box member that includes an internal thread and a pin member that includes an external thread. The external thread is adapted to threadedly engage the internal thread. A substantially helical groove is formed on an outer surface of the box member.

In another aspect, the present invention relates to a tubular connection including a box member that includes an internal thread, a first seal surface, and a second seal surface and a pin member that includes an external thread, a third seal surface, and a fourth seal surface. The external thread is adapted to threadedly engage the internal thread, the first and third seal surfaces are adapted to form a seal against an external pressure, and the second and fourth seal surfaces are adapted to form a seal against an internal pressure upon engagement thereof. A substantially helical groove is formed on an outer surface of the box member. The substantially helical groove is positioned substantially in-lead with the internal thread.

In another aspect, the present invention relates to a method of manufacturing a tool joint comprising a pin member and a box member. The method includes selecting an outer diameter for a box member that causes the tool joint to have a greater than a selected bending strength ratio. A helical groove is formed on the outer diameter of the box member such that the helical groove reduces the bending strength ratio to be about the selected bending strength ratio. An internal thread is formed on an internal surface of the box member and an external tread is formed on an external surface of the pin member, wherein the external thread is adapted to threadably engage the internal thread.

In another aspect, the present invention relates to a method of modifying a box member that includes an internal thread.

The method includes forming a substantially helical groove on an outer surface of the box member. The substantially helical groove is positioned substantially in-lead with the internal thread.

In another aspect, the present invention relates to a method of manufacturing a box member. The method includes forming an internal thread on an internal surface of a cylinder and forming a substantially helical groove on an outer surface of the cylinder. The substantially helical groove is positioned substantially in-lead with the internal thread.

Other aspects and advantages of the invention will be apparent from the following description and the appended claims.

DETAILED DESCRIPTION

In one aspect, the present invention relates to tubular connections. More specifically, the present invention relates to managing stress in tubular connections.

An expansion tool is typically used to plastically radially expand a string of casing or tubing disposed inside a wellbore from an initial condition (e.g., from an initial diameter) to an expanded condition (e.g., with a larger diameter). One common prior-art expansion process shown in FIG. 1 uses a conically tapered, cold-forming expansion tool 101 (commonly referred to as a "pig") to expand casing in a wellbore. The expansion tool 101 is generally sealed inside of a pig launcher (not shown), which is a belled section attached to a lower end of a casing string that is run into the wellbore. Because the pig launcher must pass through the parent casing already installed in the wellbore, the pig launcher has an outer diameter that is less than a "drift diameter" of the parent casing. As used herein, the "drift diameter" is the maximum external diameter that can pass through a wellbore. Generally, the drift diameter is somewhat smaller than the internal diameter of the wellbore due to the wellbore not being perfectly straight. Because of this, a tool having exactly the internal diameter of the wellbore would be unable to move freely through a wellbore.

Figure 1:
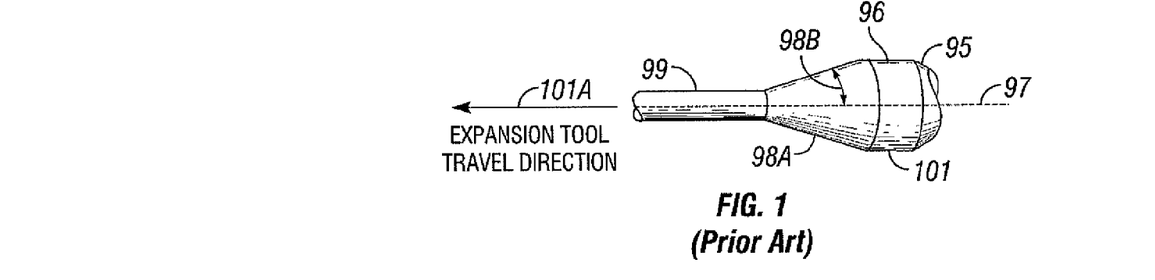
FIG. 1 shows a typical radial expansion tool.

Typically, after running the casing string into the wellbore, the casing string is suspended inside the wellbore using slips (not shown). Then, drill pipe (not shown) is run into the wellbore and latched onto the expansion tool 101. After connecting the drill pipe, the weight of the casing string is supported by the expansion tool 101. The drill pipe is then used to further lower the casing string to the selected location in the wellbore. The expansion tool 101 includes a tapered section 98A having a taper angle 98B that is generally between 5 degrees and 45 degrees. The expansion tool 101 is generally symmetric about a longitudinal axis 97 thereof. The expansion tool 101 also includes a cylindrical section 96 having a diameter that corresponds to a desired expanded inner diameter of a casing string (not shown) that is followed by a tapered section 95.

The next step in this particular expansion process is to pump cement through the drill pipe and out of a cement port on the pig. The cement flows between the outside of the casing string to be expanded and the inside of the wellbore. After the selected amount of cement has been pumped, the cement port is sealed off, typically by a dart designed to seat in the cement port. The dart is usually pumped with drilling fluid through the drill pipe. Continuing to pump drilling fluid pressurizes the pig launcher, which drives the expansion tool 101 forward (i.e. upward toward the surface) and the casing further into the wellbore. As the expansion tool 101 moves forward, the casing sting expands. Expansion continues until the entire casing string has been expanded. In many instances, the casing string will include a length of casing that remains inside the parent casing after expansion. The extra length of casing can be designed to act as a liner hanger for the casing string and to seal between the parent casing and the expanded casing string.

In this expansion process, a rate of radial expansion is determined by, for example, a total plastic strain required to expand the casing string, the taper angle 98A, and a rate of axial displacement of the expansion tool 101 through the casing string. Consistency of the expansion process is controlled by transitions along the expansion tool 101 and a cross-sectional area of, for example, lengths of casing that form the casing string, threaded connections that couple the length of casing, and the like.

The above expansion process is only one example of expansion processes known in the art. The expansion tool 101 may be started at either the bottom or the top of the casing string depending on the tool design and the application. Radial expansion may be performed at rates of, for example, 25 to 60 feet per minute. Other expansion processes, such as expansion under localized hydrostatic pressure, or "hydroforming," are known in the art, but are generally not used as much as cold-forming expansion processes. Other expansion tools for cold-forming the casing also exist. One of ordinary skill in the art will appreciate that the expansion process to be used in some embodiments of the invention may vary without departing from the scope of the present invention.

While the tapered expansion tool method has proven to work quite well on tubular bodies of casing strings, the expansion of made-up threaded connections has exposed structural sealing problems in the expanded threaded connections. Threaded connections that undergo radial plastic expansion have a tendency to exhibit a non-uniform axial elongation and react differently to residual hoop stresses remaining after expansion. Specifically, male (pin) threaded members and female (box) threaded members deform differently during radial expansion. The box member will generally move away from the pin member during radial expansion. This differential displacement phenomenon results in a loss of preload in axially-engaged seals, making the use of conventional metal-to-metal seals (including, for example, shoulder seals) generally ineffective for plastically radially expanded casing and tubing.

Radial Plastic Expansion of Plain-End Pipe

When a joint of casing or tubing is radially plastically expanded, a wall thickness of the casing joint and an overall axial length of the casing joint are reduced by a process commonly referred to as "Poissoning," and residual stresses are retained in the casing joint. Proximate a middle of the casing joint, the casing joint will maintain a substantially uniform diameter and wall thickness because each discrete region experiences support from adjoining discrete regions. However, deformation proximate ends of the casing joint depends on a direction in which the expansion tool travels.

Figure 2A:
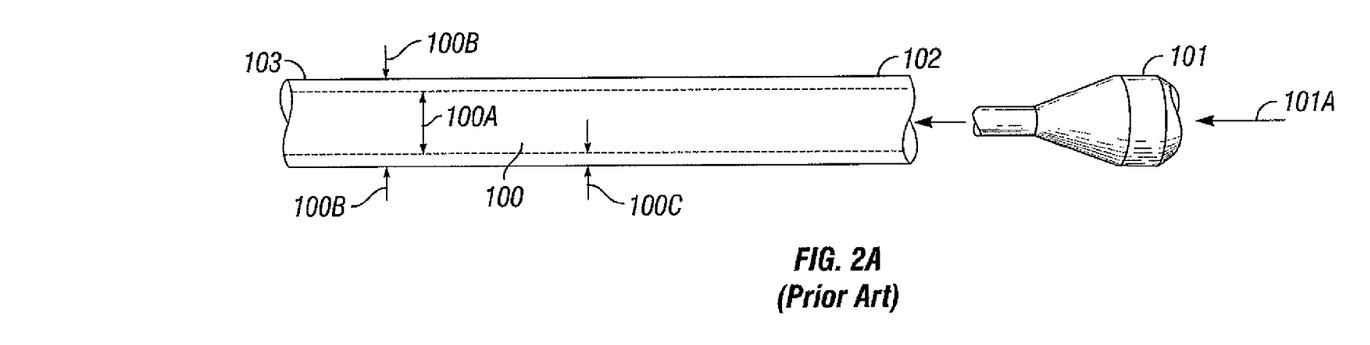
FIG. 2A shows an unexpanded joint of plain-end pipe.

FIG. 2A shows a joint of unexpanded pipe 100 with a nominal diameter-to-wall thickness ratio (d/t) of about 20. The unexpanded pipe 100 is formed from, for example, 80,000 psi yield carbon steel. No connection is formed on the unexpanded pipe 100 in FIG. 2A. The unexpanded pipe 100 has an inner diameter (ID) 100A, an outer diameter (OD) 100B, and a wall thickness 100C. The unexpanded pipe 100 is designed to be expanded with an expansion tool 101 that is generally moved through the unexpanded pipe 100 in a direction 101A from an unexpanded first end 102 toward an unexpanded second end 103.

Figure 2B:
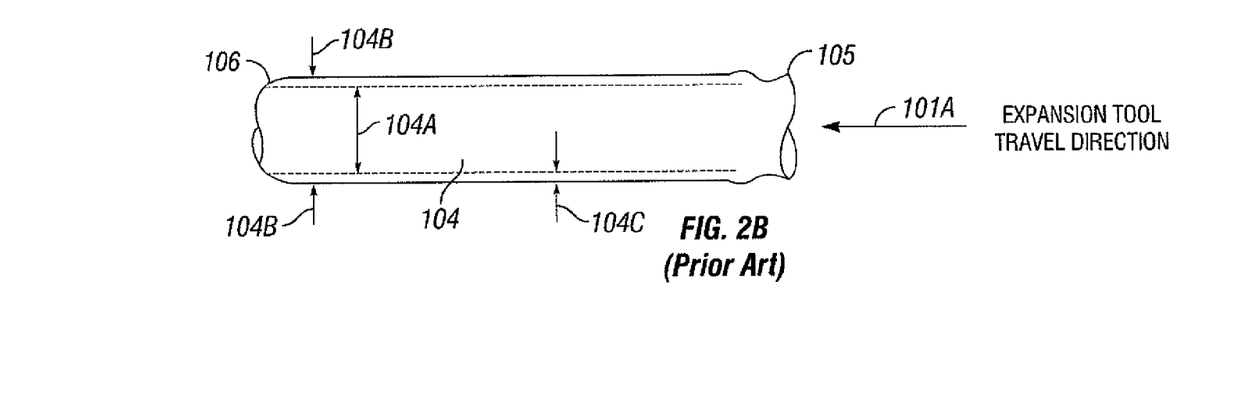
FIG. 2B shows a of the plain-end pipe joint shown in FIG. 2A after expansion.

FIG. 2B shows the joint of pipe 104 after it has been expanded. The expanded pipe 104 has an ID 104A, an OD 104B, and a wall thickness 104C. The expanded pipe 104 is shorter than unexpanded plain-end pipe (100 in FIG. 2A) (note that the extent of the shortening is exaggerated in FIG. 2B for clarity), and the wall thickness 104C of the expanded pipe 104 is generally less than the wall thickness of the unexpanded pipe (100C in FIG. 2A). Ends 105, 106 of the expanded, plain-end pipe 104 show deformations characteristic of casing and tubing which has been expanded by a conically-tapered cold-forming "pig," such as the expansion tool 101 shown in FIG. 2A. Expanded first end 105 shows radial "belling-out" at the end of the pipe and an axial "wrinkling" or "rippling" proximate a pipe section near the end. Expanded second end 106 shows a radial "belling-in" proximate the end. Note that the radial displacements of the pipe wall are exaggerated for clarity.

Figure 3A:
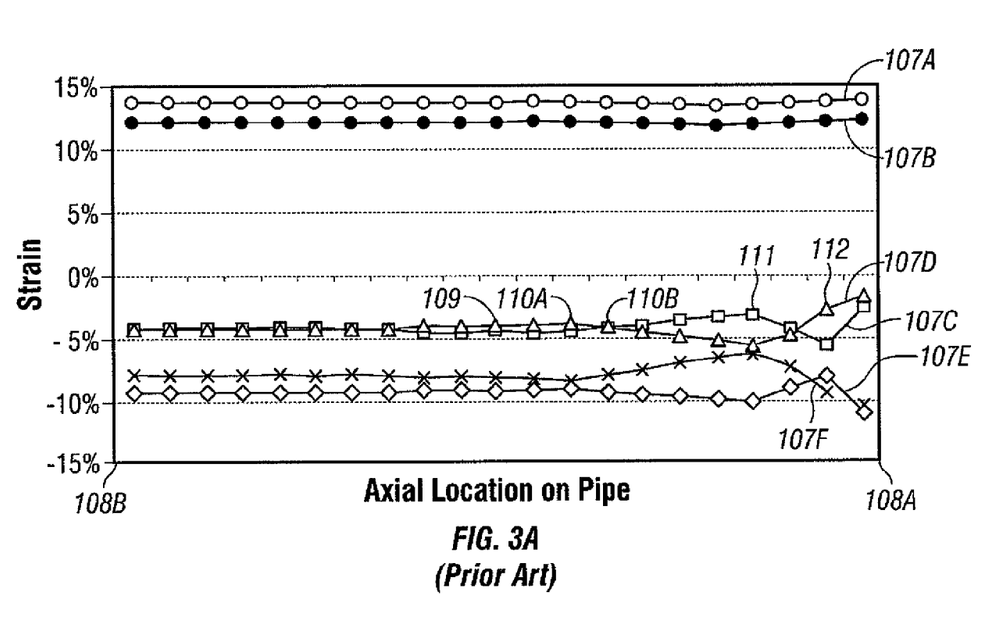
FIG. 3A shows a graph of strains along the length of the radially-expanded pipe shown in FIG. 2B proximate a first expanded end.

FIG. 3A shows a plot of strains in the expanded plain-end pipe (104 in FIG. 2B) along the length of the pipe (104 in FIG. 2B) proximate the first expanded end (105 in FIG. 2B). The strain at first expanded end (105 in FIG. 2B) is shown at chart end 108A, while the strain proximate the pipe body is shown toward chart end 108B. Note that FIG. 3B shows a cross-sectional view of the pipe that may be viewed as a physical corollary to the plots shown in FIG. 3A.

In FIG. 3A, strains at the expanded ID (104A in FIG. 3B) are shown as an ID hoop strain curve 107A, an ID axial strain curve 107C, and an ID radial strain curve 107E. Strains at the expanded outer diameter (104B in FIG. 3B) are shown as an OD hoop strain curve 107B, an OD axial strain curve 107D, and an OD radial strain curve 107F. Note that the axial strains (107C and 107D) and radial strains (107E and 107F) are substantially constant and negative in the pipe body, as shown near chart end 108B, confirming that the pipe (104 in FIG. 3B), as expected, becomes shorter and has a reduced wall thickness as it is expanded by the expansion tool (101 in FIG. 2A).

Proximate inflection point 109, the OD axial strain 107D and the ID axial strain 107C diverge, wherein the OD axial strain 107D increases (i.e., becomes less negative) and the ID axial strain 107C decreases (i.e., becomes increasingly negative), indicating that the pipe (104 in FIG. 3B) is beginning to "bulge" in a radially outward direction. When viewing from left to right at inflection point 110A, the OD axial strain 107D begins to decrease, while ID axial strain 107C begins to increase, thereby indicating that the pipe (104 in FIG. 3B) is contracting in a radially inward direction. At inflection point 110B, the axial strain curves 107C, 107D intersect. At inflection point 111, the pipe (104 in FIG. 3B) begins outward radial expansion and, at inflection point 112, the ID axial strain 107C begins to decrease while the OD axial strain 107D continues to increase (e.g., a rate of radial expansion decreases proximate the end (105 in FIG. 3B) of the pipe (104 in FIG. 3B)).

Figure 3B:
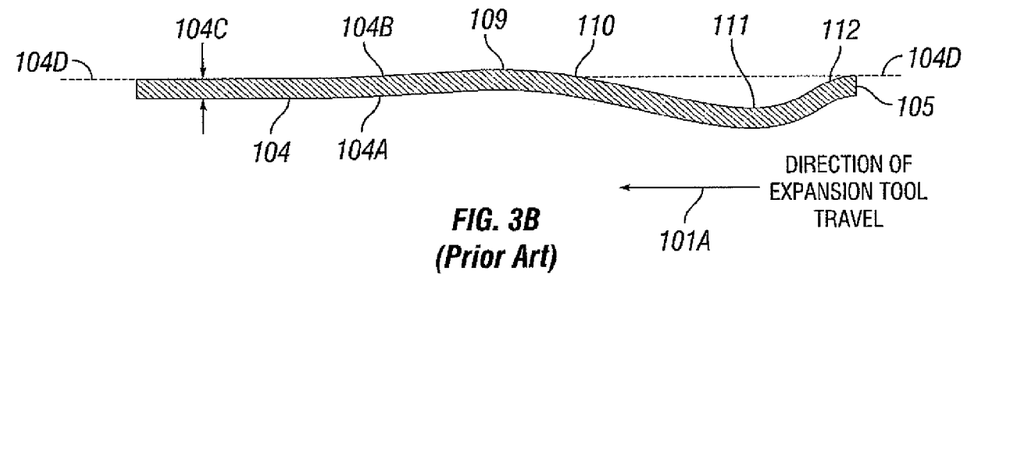
FIG. 3B shows a cross-sectional view of the radially-expanded pipe shown in FIG. 2B.

Referring to FIG. 3B, a nominal expanded outer diameter 104D of the expanded pipe 104 is shown as a reference for the radial displacements of the pipe 104 at the inflection points 109, 110A, 110B, 111, 112. Note that radial displacements of the pipe wall are slightly exaggerated for clarity. Note that a maximum displacement occurs at inflection point 111 and that a wall thickness 104C is slightly decreased proximate the end 105 of the pipe 104.

The "wrinkles" or "ripples" proximate the end of the pipe resemble, for example, a heavily-damped sinusoidal function. Based on Finite Element Analysis (FEA) and physical experimentation with the expansion process, the present inventors have hypothesized that the amplitude, period, and damping of the "ripples" depend on the total plastic expansion required in the pipe, the diameter-to-wall thickness ratio (d/t), the design of the expansion tool (particularly the taper angle), and a coefficient of friction between the expansion tool and the unexpanded pipe.

Figure 4A:
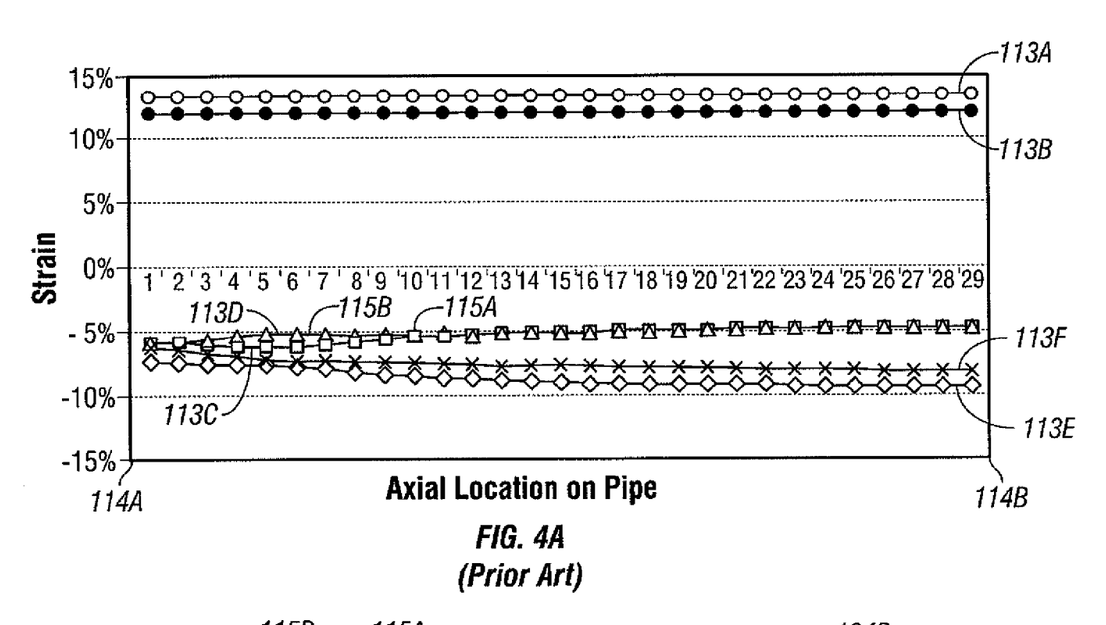
FIG. 4A shows a graph of strains along the length of the radially-expanded pipe shown in FIG. 2B proximate a second expanded end.

FIG. 4A shows a plot of strains in the pipe 104 along the length of the pipe proximate the second expanded end 106. The strains at the second expanded end 106 are shown at chart end 114A, while the strains toward the pipe body are shown toward chart end 114B. Note that FIG. 4B shows a cross-sectional view of the pipe that may be viewed as a physical corollary to the plots shown in FIG. 4A.

Strains at an expanded inner diameter (ID) 104A are shown as an ID hoop strain curve 113A, an ID axial strain curve 113C, and an ID radial strain curve 113E. Strains at an expanded outer diameter (OD) 104B are shown as an OD hoop strain curve 113B, an OD axial strain curve 113D, and an OD radial strain curve 113F. Note that the axial strains (113C and 113D) and the radial strains (113E and 113F) are substantially constant and negative in the pipe body, as shown near chart end 114B, confirming that the pipe (104 in FIG. 4B), as expected, becomes shorter and has a reduced wall thickness as it is expanded by the expansion tool (101 in FIG. 2A). Also note that strain levels in the body of the pipe (104 in FIG. 4B) (e.g., strain values at chart end 114B) shown in FIG. 4A correspond to strain levels in the body of the pipe shown in FIG. 3A (e.g., strain levels at chart end 108B).

Referring to FIG. 4A, viewing from right to left at inflection point 115A, the OD axial strain curve 113D is increasing (i.e., becomes less negative) while the ID axial strain curve 113C is decreasing (i.e., becomes increasingly negative), indicating that the pipe (104 in FIG. 4B) is beginning to bulge radially outward. At inflection point 115B, the OD axial strain curve 113D is decreasing while the ID axial strain curve 113C is increasing, indicating that the pipe (104 in FIG. 4B) is belling radially inward. Note that the "inward belling" trend continues all the way to the second expanded end (106 in FIG. 4B), represented at chart end 114A.

Figure 4B:
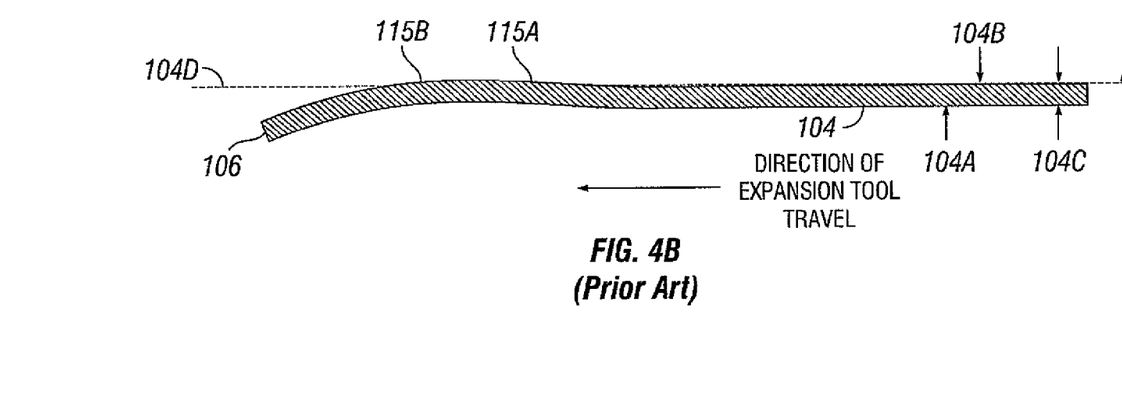
FIG. 4B shows a cross-sectional view of the radially-expanded pipe shown in FIG. 2B.

FIG. 4B shows a nominal outer diameter 104D of the expanded pipe body as a reference for radial displacements of the pipe 104 at the inflection points 115A, 115B. Note that radial displacements of the pipe wall are slightly exaggerated for clarity and that a wall thickness 104C remains substantially constant. At inflection point 115A, there is the predicted outward belling of the pipe. As discussed with respect to FIG. 4A above, the pipe 104 begins inward radial belling at inflection point 115B and continues to bell radially from the inflection point 115B to the second expanded end 106.

Radial Plastic Expansion of Threaded Tubing Joints

When designing threaded connections for radially expandable tubing or casing joints, the present inventors have discovered methods for compensating for the aforementioned axial and radial displacements that occur in the tubing joints proximate the threaded connections. Accordingly, embodiments of the invention are designed to compensate for the axial and radial displacements proximate ends of threaded pipe joints, casing joints, and tubing joints after radial plastic expansion thereof. In some embodiments, selectively placed grooves are used to maintain the integrity of the threaded connections after radial plastic expansion thereof.

It has been determined from experimentation that when a length of pipe comprising made-up vee-type or square-shouldered threaded connections (such as APT "round" or "buttress" threads) is radially plastically expanded, plastic deformation of the made-up connections results in axial and radial displacements that are similar to the aforementioned axial and radial displacements experienced during radial plastic expansion of plain-end pipe because the threads do not provide significant resistance to relative radial deformation of the pin and box members. For example, when a radial expansion tool is moved in an axially upward direction through a typical string of casing (which is usually run into a wellbore with the pin connection ends pointed down ("pin-down")), a pin end of a made-up connection comprising API buttress threads would be deformed in a manner similar to the expanded first end (105 in FIG. 2B) shown in FIG. 2B, while a box end would be deformed in a manner similar to the expanded second end (106 in FIG. 2B) shown in FIG. 2B. Because the pin and box ends (in this example comprising API buttress threads) are radially unrestrained with respect to each other, the box end will generally radially "bell-out" and the pin end will generally radially "bell-in" as described in detail above.

However, it has been determined through experimentation and Finite Element Analysis (FEA) that if the threaded connection resists radial deformation, as in the case when generally dovetail-shaped threads are used to form the threaded connection, then unsupported ends (e.g., portions of the threaded connection extending past the last engaged thread) of both the box and pin connections will generally radially bell inward in a fashion similar to the expanded second end (106 in FIG. 2B) shown in FIG. 2B. Accordingly, an external metal-to-metal seal (e.g., a seal formed between the pin connection and the box connection proximate an outer shoulder formed by the end of the box connection) can be formed with a generally dovetail-shaped thread form because of increased contact stresses between the box end and a pin shoulder proximate the box end generated when the box end bells radially inward after radial plastic expansion thereof. However, an internal metal-to-metal seal (e.g., a seal formed proximate a pin nose on the pin connection) is difficult to maintain, even with a generally dovetail-shaped thread, because the pin nose end tends to bell inward (away from the box connection) after radial plastic expansion thereof. Other sealing mechanisms for tubular connections, such as elastomeric seals, encounter similar difficulties.

U.S. Pat. No. 5,423,579, issued to Blose at el., and assigned to the assignee of the present invention and incorporated by reference herein in its entirety, discloses a metal-to-metal seal design for threaded tubular connections. To form a reliable metal-to-metal seal, the pin and box connections generally contact each other so as to form a thin, cylindrical contact area (which may be achieved by, for example, using mismatched angles on corresponding pin and box elements), and the connection must generally be tightened so as to form a selected minimum contact stress at the seal contact area (e.g., so as to seal against internal and/or external pressure). Accordingly, in order to form a reliable metal-to-metal seal proximate threaded connections disposed on radially plastically expanded casing strings, the connection should be designed so as to relieve expansion stresses to prevent damage to the connection and maintain a seal contact area.

In certain embodiments of the invention described herein, threads used to form threaded connections are "wedge" threads comprising generally dovetail-shaped threads with converging thread widths. Wedge threads are known in the art and are disclosed in, for example, U.S. Pat. No. RE30,647 issued to Blose, U.S. Pat. No. RE34,467 issued to Reeves, U.S. Pat. No. 4,703,954 issued to Ortloff et al., and U.S. Pat. No. 5,454,605 issued to Mott, all assigned to the assignee of the present invention. Each of these patents is incorporated herein by reference. Wedge threads used in these specific embodiments of the invention comprise generally dovetail-shaped threads in which, for example, a crest of a thread is wider than a root of the thread and wherein two thread flanks comprise different but constant leads. A width of the wedge thread form generally changes along the length of the thread (e.g., along a helical thread form) so that, as the connection is "made-up" (screwed together), thread flanks formed on connecting pin and box members get closer together. Moreover, some embodiments of the invention may comprise wedge thread forms in which both flanks have a corresponding negative angle (with respect to an the axis of the tubular member on which they are formed), in which one flank has a negative angle and one flank has a positive angle, and the like as long as a crest of the thread form is generally wider than a root of the thread form. Further, wedge threads may also be formed with non-dovetailed thread forms.

Wedge threads are preferred for use in some embodiments of the invention because, for example, they do not require separate torque shoulders. They do not require separate torque shoulders because converging load and stab flanks disposed on the wedge threads react against one another at make-up. Moreover, the generally dovetail-shape of the thread form provides resistance to radial separation of the box and pin during radial plastic expansion of the connection.

Note that wedge threads may also provide some advantages with radially plastically expandable casing strings and the like because traditional "shouldered" threaded connections may experience severe wear and/or disintegration of the shoulders because axial shrinkage of the casing string (e.g., due to "Poissoning") during radial plastic expansion may raise the contact stresses at the shoulders beyond an ultimate compressive strength of a material from which the casing string is formed. However, for moderate radial plastic expansion (e.g., for substantially less than 10% expansion), a shouldered connection comprising generally dovetail-shaped threads may provide adequate resistance to radial separation of the connection during expansion and a sufficient contact stress at the shoulder. It will be appreciated by those skilled in the art that a "semi-dovetailed" thread form (e.g., a thread form wherein one of the thread flanks is at an approximately 90 degree angle with respect to the pipe axis) may also provide resistance to radial separation of the connection during expansion. In other embodiments, no dovetail may be present at all. Accordingly, the invention is not intended to be limited by embodiments described herein that include a "dovetailed" thread form.

Figure 5:
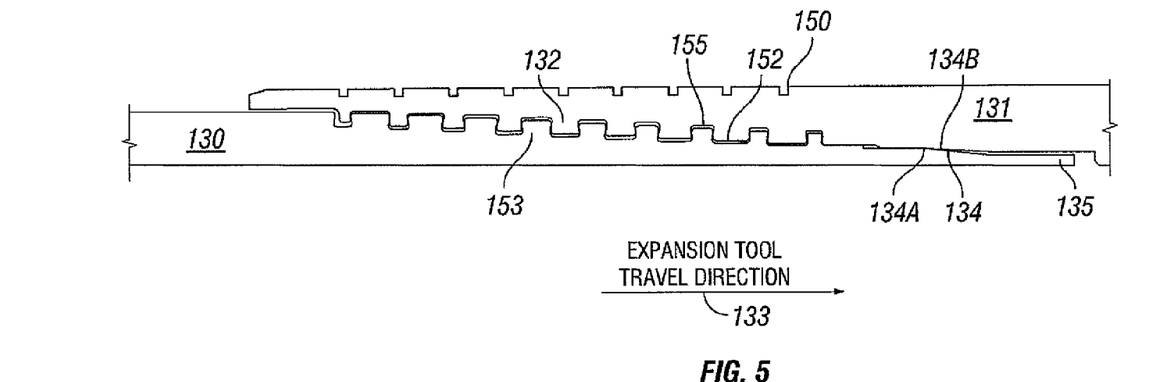
FIG. 5 shows a cross-sectional view of a tubular connection in an unexpanded condition in accordance with an embodiment of the present invention

FIG. 5 shows an embodiment of the invention in a substantially unexpanded state. The connection comprises a pin member 130 having external threads 153, and a box member 131 having internal threads 132. Moreover, the pin member 130 and the box member 131 may comprise corresponding adjacent seal surfaces 134A, 134B, respectively, adapted to form a metal-to-metal seal 134 upon make-up of the connection. In some embodiments, the threads 153 and 132 may be wedge threads as shown in FIG. 5. In this embodiment, the threads 153 and 132 are generally dovetail-shaped, which helps prevent the pin member 130 and the box member 131 from deforming radially relative to one another during radial plastic expansion. A direction of travel 133 of an expansion tool (not shown) used to radially plastically expand the connection, in view of the discussion above, determines that the pin connection 130 will behave similarly to the second expanded end of plain end pipe (106 in FIG. 3A) in a region of the seal 134 defined by contact between adjacent seal surfaces 134A, 134B (i.e., a distal end 135 of the pin 130 will tend to bell inwards after radial plastic expansion thereof).

In the embodiment shown in FIG. 5, a helical groove 150 having a rectangular cross section is formed on the outside of the box member 131. One of ordinary skill in the art will appreciate that the cross section of the helical groove 150 may vary in size and shape without departing from the scope of the invention. For example, in other embodiments, the helical groove 150 may have a V-shaped, parabolic, U-shaped, or semi-circle cross section. The helical groove 150 is at substantially the same axial position as the crest 152 of the internal thread 132. This positioning of the helical groove 150 may be referred to as being "in-lead" above the internal thread 132. Because the expansion tool does not contact the box member, only the pin member (130 in the embodiment in FIG. 5) directly experiences axial force imposed by the expansion tool. This causes the pin member 130 to elongate, which forces the box member 131 to elongate a lesser amount due to the connection between the two members. The wedge thread 132 on the box member resists the elongation because of the thickness at the crest 152. By locating the helical groove 150 in-lead above the crest 152 of the internal thread 132, the wall thickness of the box member is reduced where it normally has an increased thickness. The reduction in wall thickness resulting from the helical groove 150 relieves the axial stress experienced by the internal thread 132. At the same time, the overall axial and hoop strength of the connection is not significantly reduced because the minimum wall thickness (occurring at the root 155 of the internal thread 132) of the box member is not reduced.

Figure 6A:
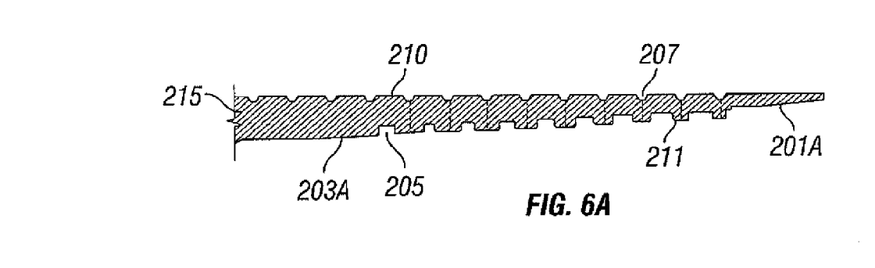
FIG. 6A shows a cross-sectional view of a box member in accordance with an embodiment of the present invention.
Figure 6B:
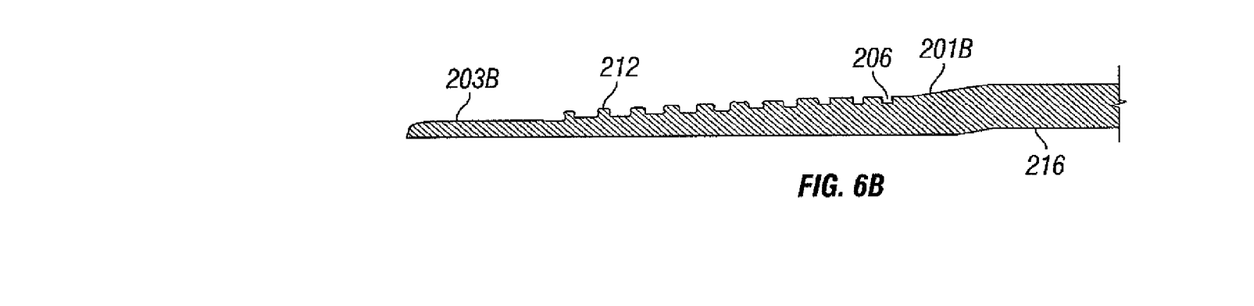
FIG. 6B shows a cross-sectional view of a pin member adapted to connect to the box member shown in FIG. 6A in accordance with an embodiment of the present invention.

Turning to FIGS. 6A and 6B, a box member 215 and pin member 216 in accordance with an embodiment of the present invention are shown. The box member 215 and pin member 216 have an internal thread 211 and an external thread 212, respectively, and are adapted to threadedly engage with each other to connect two tubular members. A helical groove 207 having a trapezoidal cross section is formed on the outside surface of the box member 215. The in-lead location of the helical groove 207 is illustrated by dashed lines drawn from the helical groove 207 to the internal thread 211. The placement and helical nature of the helical groove 207 does not significantly reduce the critical section 210 of the box member 215, which determines the maximum tension and compression that the connection box member 215 will withstand. The "critical section" is located at the smallest cross section of the box member 215 that must withstand the full axial load. The area of the critical section 210 is measured transverse to the axis (not shown) of the tubular. In this particular embodiment, the location of the critical section 210 coincides with the circumferential groove 205. In embodiments that do not have a circumferential groove 205, the critical section 210 may be located at a thread relief groove (not shown). The critical section 210 is commonly a failure point for a box member during compressive and tensile loads. Because the helical groove 207 removes only a small portion of material from any axial location on the box member, there is little effect on the critical section 210.

In the embodiments shown in FIGS. 6A and 6B, there are four separate seals. The box member 215 has two sealing areas 201A and 203A that are adapted to form seals with sealing areas 201B and 203B, respectively, located on the pin member 216. The box member 215 and pin member 216 have grooves 205 and 206, respectively, formed thereon that are adapted to contain separate sealing rings (not shown), such as an elastomeric O-ring. Sealing areas 201A and 201B and the sealing ring located in groove 206 seal against external pressure. Sealing areas 203A and 203B and the sealing ring located in groove 205 seal against internal pressure. The properties of embodiments of the present invention help to maintain these seals during the radial plastic expansion of the connection.

While the above embodiments illustrate helical grooves having a constant cross section, the scope of the present invention is not limited to constant cross sections. In some embodiments, the helical groove may vary in width at a rate equal to the varying of the width of the crest of a wedge thread on the box member. In some embodiments, the depth of the helical groove may vary along the axial length of the box member. For example, it may be desirable to have a shallower helical groove on the distal end of the box member where the cross section is thinnest. One of ordinary skill in the art will appreciate that the shape and size of the cross section of the helical groove may vary without departing from the scope of the present invention. Furthermore, the helical groove may have a length less than the length of the internal thread. One of ordinary skill in the art will appreciate that the helical groove may occur on only a portion or the entire length of the box member without departing from the scope of the present invention.

While the helical grooves discussed in the above embodiments are useful for maintaining strength and seal integrity of connections on tubular members that are intended to be radially plastically expanded, the helical grooves also help to resist the effects of damage on the external surface of the box member. Severe scratches and gouges occur on the external surface of the box member during surface handling (e.g., making up of connections) and when running the tubular members into the well. Additional scratches and gouges may occur while passing the tubular members through a casing window located in the well. These scratches and gouges act as stress risers that can cause the splitting of the box member during the expansion process. When severely stressed, these scratches and gouges can form cracks that will propagate. Cracks resulting from axial scratches and gouges, such as those that occur during the sliding of the tubular member in a well, typically propagate along the axis of the box member when exposed to severe hoop stress. Cracks resulting from circumferential scratches and gouges, such as those that occur during the making up of connections, typically propagate in the circumferential direction when exposed to severe axial stress. A helical groove may help reduce the propagation of those cracks in both the axial and circumferential directions. This advantage of the helical groove formed on the outside surface of the box member may also be useful for connections that are not intended for expansion.

Forming a helical groove on the OD of a box member has been discovered by the present inventors to be particularly useful for connections of tubulars, such as drill pipe and drill collars. Drill collars are typically manufactured from one piece of pipe having a substantially constant OD. Connections for drill collars generally have the same OD as the body of the drill collar. Drill pipe is typically manufactured by welding a tool joint on each end of a section of tubular. The tool joint typically has an OD greater than the drill pipe. The tool joint includes a connection having either an internal thread (box) or external thread (pin). A standard section of drill pipe would have a pin member on one end, and a box member on the opposing end.

Figure 7A:
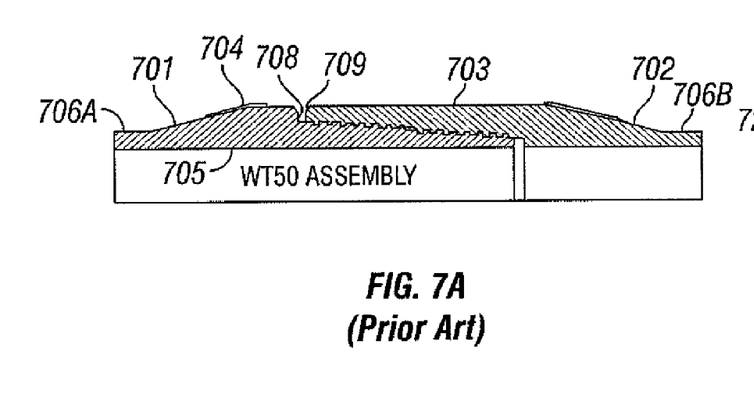
FIG. 7A shows a cross-sectional view of a prior art tool joint.

FIG. 7A shows a cross section of a prior art tool joint. The tool joint has a pin member 701 and a box member 702, which are adapted to connect to each other. The pin member 701 is attached to a section of drill pipe 706A. The box member 702 is attached to a section of drill pipe 706B. The OD 703 of the tool joint is larger than the OD of the drill pipe 706A and 706B. The ID 705 of the tool joint is typically smaller than the ID of the drill pipe 706A and 706B.

Continuing with FIG. 7, the OD 703 of a tool joint experiences wear during use. Most of the wear results from rotating the drill pipe in the wellbore. The rate of wear varies by application, depending on the conditions of the particular wellbore. As the OD 703 wears, most connections experience a reduced torque and tensile strength because of the reduced cross-sectional area. Wedge threads 707 in FIG. 7, which do not depend on shoulder area 708 for strength, maintain substantially full strength up to the bevel 709 diameter. Other connections that require making up to a shoulder experience gradually reduced strength during the wear of the OD 703. After wear reduces the OD 703 past the bevel 709, the drill pipe is replaced.

To reduce wear, tool joints may have hardbanding 704 applied to portions of the tool joint. Hardbanding 704 may be added using carbide particles in a weld-metal matrix. Besides wear on the OD 703 of the tool joint, hardbanding 704 also helps to reduce the wear of the wellbore, in particular metal casing. Some situations cause wear at particularly high rates despite the use of hardbanding 704. One such situation is basaltic rock, which may be encountered while drilling in certain areas. Geothermal wells are a common location where basaltic rock may exist The basaltic rock has a high abrasiveness that rapidly erodes the OD 703 of drill pipe, as well as heavy weight drill pipe and drill collars. Drilling in basaltic rock formations has been known to reduce the useful life of drill pipe to as little as three wells, which is a small portion of the typical expected useful life.

Figure 7B:
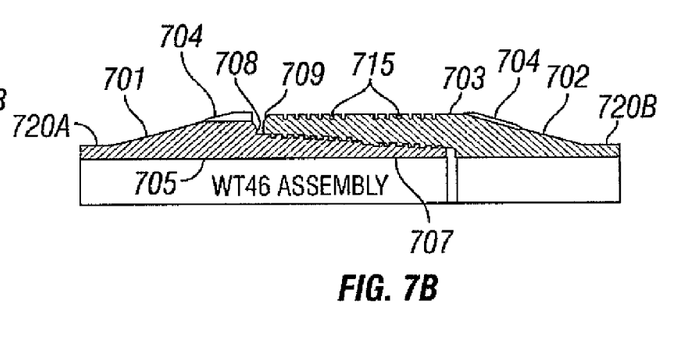
FIG. 7B shows a cross-sectional view of a tool joint in accordance with an embodiment of the present invention.

FIG. 7B shows a cross section of a tool joint in accordance with an embodiment of the present invention. The tool joint in FIG. 7B has substantially the same OD 703 as the tool joint in FIG. 7A, which makes it suitable for use in the same size wellbore as FIG. 7A. A helical groove 715 has been formed on the OD 703 of the tool joint. The helical groove 715 does not need to be in-lead with the thread 707 to experience one or more of the advantages of the present invention, however, the box member 702 is stronger if the helical groove 715 is in-lead with the thread 707.

The following comparison of FIG. 7A to FIG. 7B is intended as a specific example and should not be considered to limit the scope of the invention. As a specific example, the tool joint in FIG. 7A is a WT 50 tool joint sold by Hydril Company LP. The WT 50 tool joint commonly has an OD 703 of 6¾ inches and an ID 705 and is adapted to be attached to 19.50 lb/foot drill pipe having an OD of 5 inches and an ID of 4¼ inches. The bevel 709 diameter may be 6¹¹⁄₃₂ inches. The tool joint in FIG. 7B is similar to a WT 46 tool joint sold by Hydril Company LP, and, therefore, would typically have a smaller OD than the WT 50 tool joint in FIG. 7A, and would have less strength than the WT 50 tool joint if the ID 705 is kept the same as that of a WT 50 tool joint. If reduced strength is not allowable, then the ID 705 may be reduced. A reduced ID, however, results in an increased pressure drop when drilling fluid is pumped through the drill pipe. In the embodiment shown in FIG. 7B, however, the OD of the tool joint has been increased to be equal to the OD of the WT 50 tool joint, while the ID 705 has been kept the same as that of the WT 50 tool joint. As a result the pin member 701 on the tool joint has a reduced strength compared to the WT 50 tool joint.

Because the OD of the tool joint shown in FIG. 7B is larger than normal, the strength of the box member 702 is increased relative to the pin member 701. The ratio of box member strength to pin member strength is commonly known as the bending strength ratio (BSR). A BSR of 1 (i.e. 1:1) means that the box member and pin member have equal strength. A BSR greater than 1 means that the box member is stronger than the pin member. If a box member is too strong (stiff) in bending relative to the pin member, the pin member may be damaged when the tool joint experiences bending. The desirable BSR varies for different threads. For example, a wedge thread tool joint (as in the WT 46 and WT 50) generally has a desired BSR between 1.0 and 1.5. For most American Petroleum Institute (API) tool joints, the BSR should be about 2.5. For most API connections, the relative flexibility of the pin member causes the pin member to stretch during make-up of the connection, which preloads the connection. One of ordinary skill in the art will appreciate that the desired BSR may vary depending on the particular tubular connection. Accordingly, embodiments of the present invention are not limited to particular values for the BSR.

Maintaining the OD 703 and ID 705 of the WT 46 tool joint to be equal to the WT 50 tool joint would result in a higher BSR than may be desired. This is because the box member 701 has been strengthened relative to the pin member 702. To reduce the BSR, a helical groove 715 may be formed in the OD 703. The helical groove 715 removes material from the box member 702, which causes it to be more flexible. The depth, width, and pitch of the helical groove 715 may be varied depending on the required reduction of the BSR. Removing more material reduces the BSR, but results in less material for wear resistance. In one embodiment, the helical groove 715 is in-lead with the thread 707 on the box member 702, and has a depth equal to the bevel 709. One of ordinary skill will appreciate that the balance of BSR and wear resistance may vary without departing from the scope of the present invention. The excess material on the box member 702 provides more material to be worn during usage. Thus, it provides a longer useful life for the same rate of wear. Additionally, the helical groove 715 provides an easily observable wear indicator. If the depth of the helical groove 715 is near the minimum useful OD of the tool joint, one would know to replace the drill pipe when the helical groove 715 is no longer visible.

While FIGS. 7A and 7B provide specific examples, one of ordinary skill in the art will appreciate the same principles can be applied to other connections to achieve one or more of the advantages of the present invention. In summary, a smaller tool joint than normal may be selected, while maintaining the OD of a larger tool joint. The addition of a helical groove removes material from the box member, which results in a more flexible box member to achieve a desired BSR. A helical groove may also be formed on box members of drill collars in a similar manner to provide a useful wear indicator and to increase the flexibility of the box member. Further, a helical groove may be formed on connections in any application where OD wear is a concern to achieve one or more of the advantages of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to manufacture a tool joint including a pin member and a box member, the method comprising:
   selecting a desired bending strength ratio for the box member;
   forming an outer diameter for the box member to exceed the selected bending strength ratio;
   forming a helical groove in the formed outer diameter;
   reducing a bending strength ratio of the box member with the formed helical groove to the selected bending strength ratio;
   forming an internal thread on an internal surface of the box member; and
   forming an external thread on an external surface of the pin member, wherein the external thread is adapted to threadably engage the internal thread.

2. The method of claim 1, wherein the helical groove is positioned substantially in-lead with the internal thread.

3. The method of claim 1, further comprising:
   forming a first seal surface on the internal surface of the box member; and
   forming a second seal surface on the external surface of the pin member;
   wherein the first and second seal surfaces are adapted to form a seal after radial plastic expansion of the tool joint.

4. The method of claim 1, wherein the internal thread and external thread comprise substantially dovetail-shaped threads.

5. The method of claim 1, wherein the helical groove has a profile selected from the group consisting of trapezoidal, V-shaped, parabolic, U-shaped, and semi-circular cross sections.

6. The method of claim 1, wherein the helical groove has a cross section that varies along an axial length of the box member.

7. The method of claim 1, wherein the internal thread and the external thread comprise wedge threads.

8. The method of claim 7, wherein a width of the helical groove varies at a rate substantially equal to a varying of a width of crests of the internal thread.

9. The method of claim 7, wherein the internal thread and external thread are substantially dovetail-shaped threads.

10. The method of claim 1, further comprising:
    forming a first seal surface and a second seal surface on the internal surface of the box member; and
    forming a third seal surface and a fourth seal surface on the external surface of the pin member;
    wherein the first and third seal surfaces are adapted to form a seal against an external pressure upon engagement thereof; and
    wherein the second and fourth seal surfaces are adapted to form a seal against an internal pressure upon engagement thereof.

11. The method of claim 10, further comprising:
    forming a groove on the internal surface of the box member proximate the second seal surface, wherein the groove is adapted to receive a sealing ring.

12. The method of claim 10, further comprising:
    forming a groove on the external surface of the pin member proximate the third seal surface, wherein the groove is adapted to receive a sealing ring.

* * * * *